J. HOLZSAGER.
SHAVING CUP.
APPLICATION FILED JAN. 8, 1908.

903,089.

Patented Nov. 3, 1908.

WITNESSES

INVENTOR
Jonas Holzsager
BY
ATTORNEYS.

UNITED STATES PATENT OFFICE.

JONAS HOLZSAGER, OF NEW YORK, N. Y.

SHAVING-CUP.

No. 903,089.  Specification of Letters Patent.  Patented Nov. 3, 1908.

Application filed January 8, 1908. Serial No. 409,796.

*To all whom it may concern:*

Be it known that I, JONAS HOLZSAGER, a citizen of the United States, and a resident of the city of New York, borough of Manhattan, in the county and State of New York, have invented a new and Improved Shaving-Cup, of which the following is a full, clear, and exact description.

This invention is an improvement in shaving cups, having in view a sanitary cup adapted to retain a cake of soap in the center of its bottom and provide a rubbing surface about the soap. To this end I construct the bottom of the cup with a central depression and make the adjoining portion of the bottom at a higher level to provide an annular rubbing surface, whereby the brush may have a complete sweep on this surface around the soap in the production of the lather. I also preferably provide the cup with a handle and a discharge spout, the latter being arranged at the side of the cup at right-angles to the handle; this arrangement of the spout permitting the convenient tilting of the cup in pouring off an excess of water or draining it.

Reference is to be had to the accompanying drawings forming a part of this specification, in which similar characters of reference indicate corresponding parts in both views.

Figure 1:
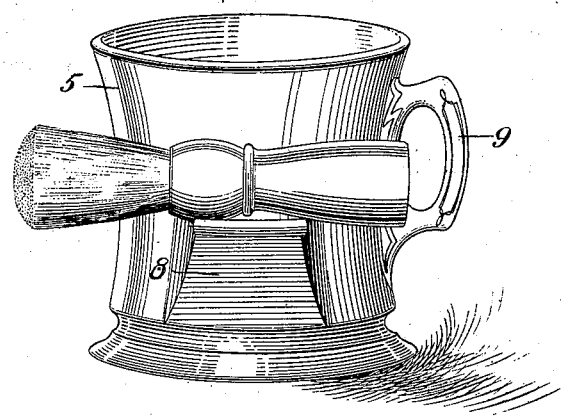
Figure 2:
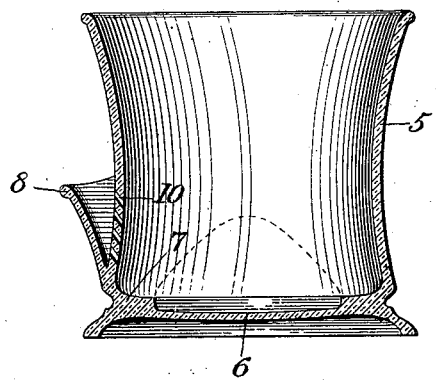

Figure 1 is a perspective view of the cup illustrating the manner in which the brush is disposed when not in use; and Fig. 2 is a central vertical section through the cup and its spout.

A shaving cup 5 constructed in accordance with my invention presents a relatively deep receptacle or vessel preferably made of a material that can be economically ornamented, as china, and has in its bottom a central depression 6 for containing the soap, the latter being shown in dotted outline in Fig. 2. The margin of this depression presents a substantial shoulder which keeps the soap from sliding about or being accidentally displaced from its seat.

The depression 6 is of such diameter as to leave a portion of the bottom of the cup between the depression and the cup's side, forming an annular rubbing surface 7 for the brush, and is arranged at an elevation above the bottom of the depression. This rubbing surface extends entirely around the depression, and consequently when the soap is in place permits of the brush having a full sweep thereabout in the production of the lather. In this manner all of the soap may be dissolved and a lather of a smooth and delicate quality rapidly produced.

Where the annular rubbing surface 7 connects with the sides of the cup, a fillet is preferably formed, as shown in Fig. 2, which, in connection with the elevation of the surface 7, admits of the bottom of the cup being easily and thoroughly cleansed, and as a consequence kept in a sanitary condition; this being an important feature of my invention.

In order that the cup may be drained or any excess of water poured off without emptying the same over the top edge of the cup, I provide a discharge spout 8, which is arranged at the side of the cup at a slight elevation above the annular rubbing surface 7 and at right-angles to the handle 9, which arrangement makes it possible to easily tilt the cup to the side of the spout. Communication between the cup and spout is preferably effected by forming in the side of the latter a series of perforations 10.

I am aware that prior to my invention shaving cups have been produced having depressions in the bottom, for retaining the soap, located at one side, which prevents the full sweep of the brush around the cup in producing the lather; also, that cups have been made having annular flanges in the bottom which form not only a central depression but also a deep annular channel at the outside thereof which is very difficult to keep clean and in a sanitary state. I, however, believe that I am the first to produce a cup of this character having an imperforate bottom provided with a central depression with an annular rubbing surface surrounding the depression above the top edge thereof.

Having thus described my invention, I claim as new and desire to secure by Letters Patent:

A shaving cup comprising a relatively deep vessel having an imperforate bottom integral therewith and provided with a relatively shallow central depression for receiving a cake of soap, the margin of said depression providing a shoulder for engaging the bottom edge of the soap, said bottom also having an annular rubbing surface below the normal level of the soap and arranged at approximately the same height as the top edge of the depression and surrounding the depression and contiguous thereto and to the side of the cup.

In testimony whereof I have signed my name to this specification in the presence of two subscribing witnesses.

JONAS HOLZSAGER

Witnesses:
W. W. HOLT,
JOHN P. DAVIS.